United States Patent [19]

Dreese

[11] Patent Number: 4,519,429
[45] Date of Patent: May 28, 1985

[54] LOG SHAPER

[76] Inventor: Charles H. Dreese, NW. 124 Chief Looking Glass Rd., Florence, Mont. 59833

[21] Appl. No.: 510,962

[22] Filed: Jul. 5, 1983

[51] Int. Cl.³ .............................................. B27C 9/00
[52] U.S. Cl. .................... 144/3 R; 144/2 Z; 144/133 R; 144/1 R; 144/242 R; 144/242 A; 144/4; 144/208 E; 144/249 A; 144/356; 144/367; 144/368; 198/620; 414/14; 414/18
[58] Field of Search ............. 144/1 R, 2 R, 2 Z, 3 R, 144/4, 208 R, 208 E, 133 R, 133 A, 242 R, 245 R, 249 A, 356, 367, 368; 198/620, 621; 414/14, 18

[56] References Cited

U.S. PATENT DOCUMENTS

| 2,618,842 | 11/1952 | Gridley | 414/18 |
| 2,674,779 | 4/1954 | Herzog | 414/18 |
| 4,078,592 | 3/1978 | Standal | 144/3 R |

Primary Examiner—W. D. Bray
Attorney, Agent, or Firm—Kinney & Lange

[57] ABSTRACT

A machine for forming a smooth surface on a cylindrical log workpiece as it is moved longitudinally past a cutting station which includes both shaping and planing blades. The same cutting pass also includes a cove cutting operation to cut a longitudinal cove cut on the surface of the log workpiece and a plurality of transverse saddle cuts across the log workpiece.

21 Claims, 22 Drawing Figures

Fig. 4

LOG SHAPER

BACKGROUND OF THE INVENTION

The present invention relates to machinery for shaping the surface of log workpieces.

Fixed diameter wood logs with longitudinal cove cuts and transverse saddle cuts are a popular building material for the construction of log homes. Conversion of irregular log workpieces into such uniform logs in a single pass of a machine is desirable from an economic standpoint.

A number of machines have been developed in the past for performing various operation on logs.

U.S. Pat. No. 4,168,675 to Chisum shows a machine for preparing logs for log houses which performs an initial shaping operation to form a cylindrically shaped log from a rough log by rotating it about its axis past a rounding cutter. The carriage is then removed to a starting position, and tongue and groove cutters are used to provide a longitudinal groove. The log is then clamped to a table in a fixed position while saddle notches are cut in its surface.

U.S. Pat. No. 3,791,430 to Hood et al again shows a machine utilizing a rotating log which is cut down to a finished surface by a cutter which is driven along the frame of the machine. In a separate cutting operation, a cove cut or longitudinal groove is cut into the leg while it is held in a non-rotating position. Saddle cuts are made transverse to the log after separate shaping and cove cutting operations are completed.

U.S. Pat. No. 4,303,111 to Neville shows a cutting device for forming a smooth cylindrical surface on a rough log. Neville does not show an entire machine, but does show a machine utilizing a rotating cutting head. No cove cutting or saddle cutting apparatus is shown in the Neville patent.

U.S. Pat. No. 3,848,647 to Fell utilizes two chipping heads for rough and finished chipping of a log into a smooth form. After that operation is completed, the log is lifted to an adjacent slide trough to receive a longitudinal groove and transverse slots. A saddle cut is separately made using a different machine. Fell U.S. Pat. No. 3,802,474 shows apparatus for making saddle cuts in logs.

U.S. Pat. No. 3,718,167 to Cervenak is directed to a limb stub cutting mechanism for removing bark and limbs from a log.

U.S. Pat. No. 4,067,368 to Beecroft shows a device for shaping cabin logs which make the cove and saddle cuts, but does not perform any continuous shaping operation on the surface of the log itself. The log must be rotated 180-degrees to make both of the shaping operations on the surface of the log.

In addition to the patents discussed above, the following patents may be of some interest or pertinence to the invention described and claimed herein:

| U.S. Pat. No. | Patentee |
| --- | --- |
| 3,276,492 | Kervefors |
| 3,016,931 | Brunkow et al |
| 3,540,498 | Woloveke |
| 4,167,964 | Paris Jr. et al |
| 2,987,085 | Porter |
| 2,800,932 | Scott |
| 3,538,963 | Adams |
| 3,538,964 | Warrick |
| 3,880,036 | Yokoyama |

-continued

| U.S. Pat. No. | Patentee |
| --- | --- |
| 3,885,483 | Ikeya et al |
| 3,583,450 | Gunnerman |
| 3,686,990 | Margolien |
| 3,343,519 | Chapman et al |
| 3,913,644 | Braun |

SUMMARY OF THE INVENTION

This invention relates to a machine for shaping cove cutting and saddle cutting irregular log workpieces into uniform diameter logs with cove and saddle cuts useful for the construction of homes and buildings. A machine for forming all of the cuts in a single pass of the log workpiece through the machine results in a simpler and more economical manufacturing operation than other prior machines which require the performing of various log processing operations in separate steps between which manipulation of the log workpiece is required by the operator. Additionally, each of the steps performed in the log manufacturing operation is performed in a highly efficient and therefore economical manner by structure according to the present invention.

It is a primary object of this invention to provide a machine for preparing finished log timbers for use in construction of log buildings with a minimum of operator intervention in the machining process.

DETAILED DESCRIPTION OF THE PREFERRED EMBODIMENTS

Figures 1, 2:
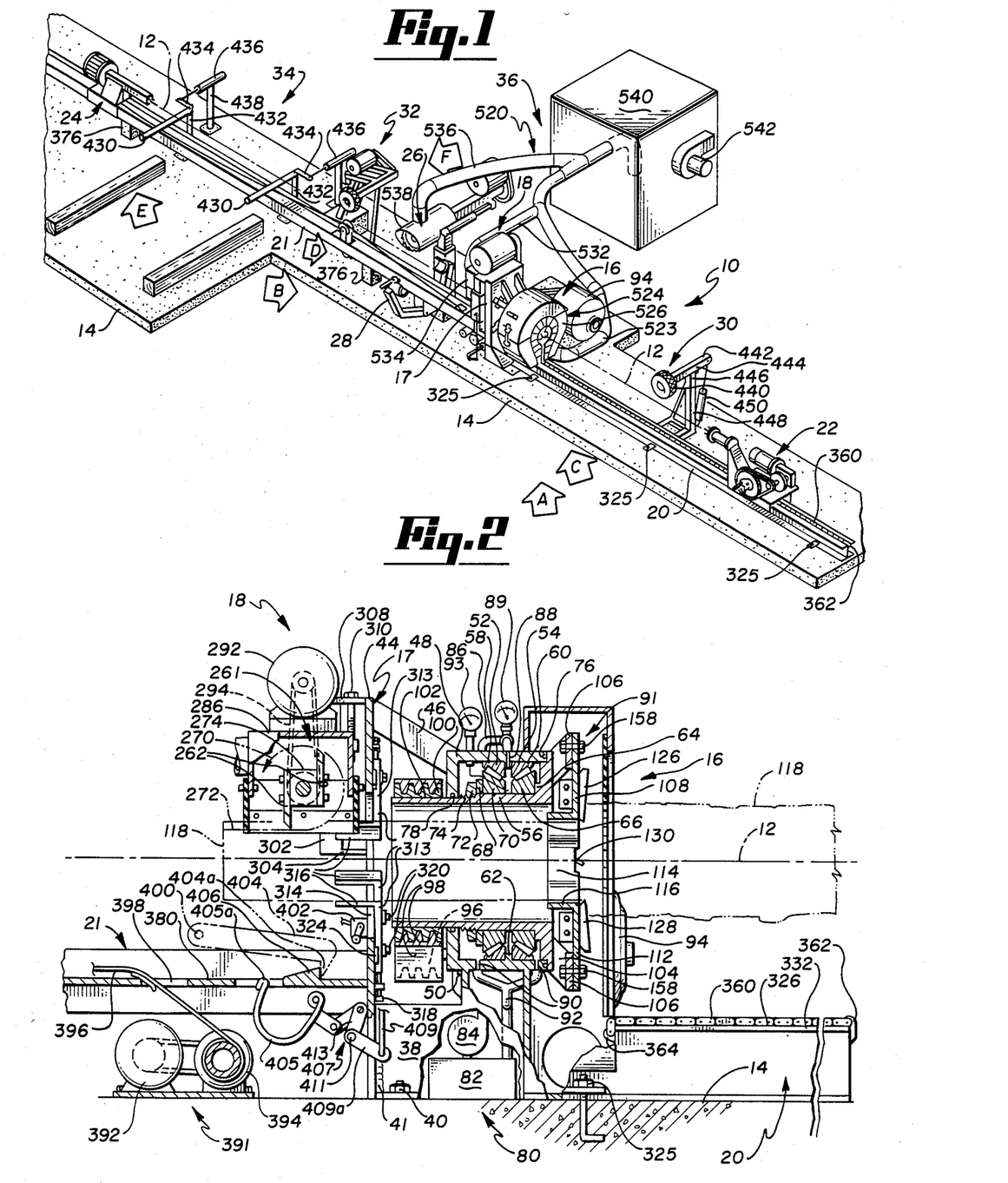
FIG. 1 is a simplified pictorial view of the invention in reduced scale.
FIG. 2 is a partial right side elevational view with parts broken away.

In FIG. 1, the log shaping apparatus 10 is shown generally and is oriented along a longitudinal axis 12. The machine includes a base 14, an annular cutter 16, a rigid frame 17, a cove cutter 18, a forward track 20, an after track 21, a transport carriage 22, a receiver carriage 24, a saddle cutter 26, a saddle cutter clamp 28, a vibration stabilizer 30, a secondary transport mechanism 32, a discharge station 34 and a wood chip/wood dust collector system 36.

Referring to FIG. 2, annular cutter 16 has a lower support 38 which is anchor-bolted to base 14 at 40 and welded to frame 17 at 41. Frame 17 projects upwardly in a plane perpendicular to base 14 and transverse to longitudinal axis 12. It has a top 44. Struts 46 are welded between frame 17 and a containment housing 48, the base of which is welded at 50 to lower support 38. Rotatably mounted on thrust bearings 52 and 54 to the inside of housing 48 is an annular carrier drum 56. Thrust bearings 52 and 54 are aligned in opposition to each other with their outer races 58 and 60, respectively, secured against the internal rim 62 between a shoulder 64 of carrier drum 56 abutting inner race 66 of bearing 54 and a large flat washer 68 abutting the opposite inner race 70 of bearing 52 and retained by a large diameter lock nut 72 threaded to carrier drum 56 at 74. Containment housing 48 is sealed against carrier drum 56 by a front o-ring seal 76 and a rear o-ring seal 75 to contain oil lubricant within a space defined by housing 48 and carrier drum 56.

In FIG. 2, a lubrication system is shown generally at 80 and includes a reservoir 82 which is set upon base 14, oil being drawn from reservoir 82 by a pump 84 and delivered via line 86 and orifice 88 to containment housing 48 where oil is inserted between thrust bearings 52 and 54. The oil passes through thrust bearings 52 and 54, providing them with cooling lubrication and passes by gravity to the drains 90 and via the return line 94 to reservoir 82. Line 86 is provided with a gauge 89 to monitor pressure and housing 48 has a gauge 93 to monitor temperature between bearings 52 and 54.

MAIN CUTTER

Figure 3:
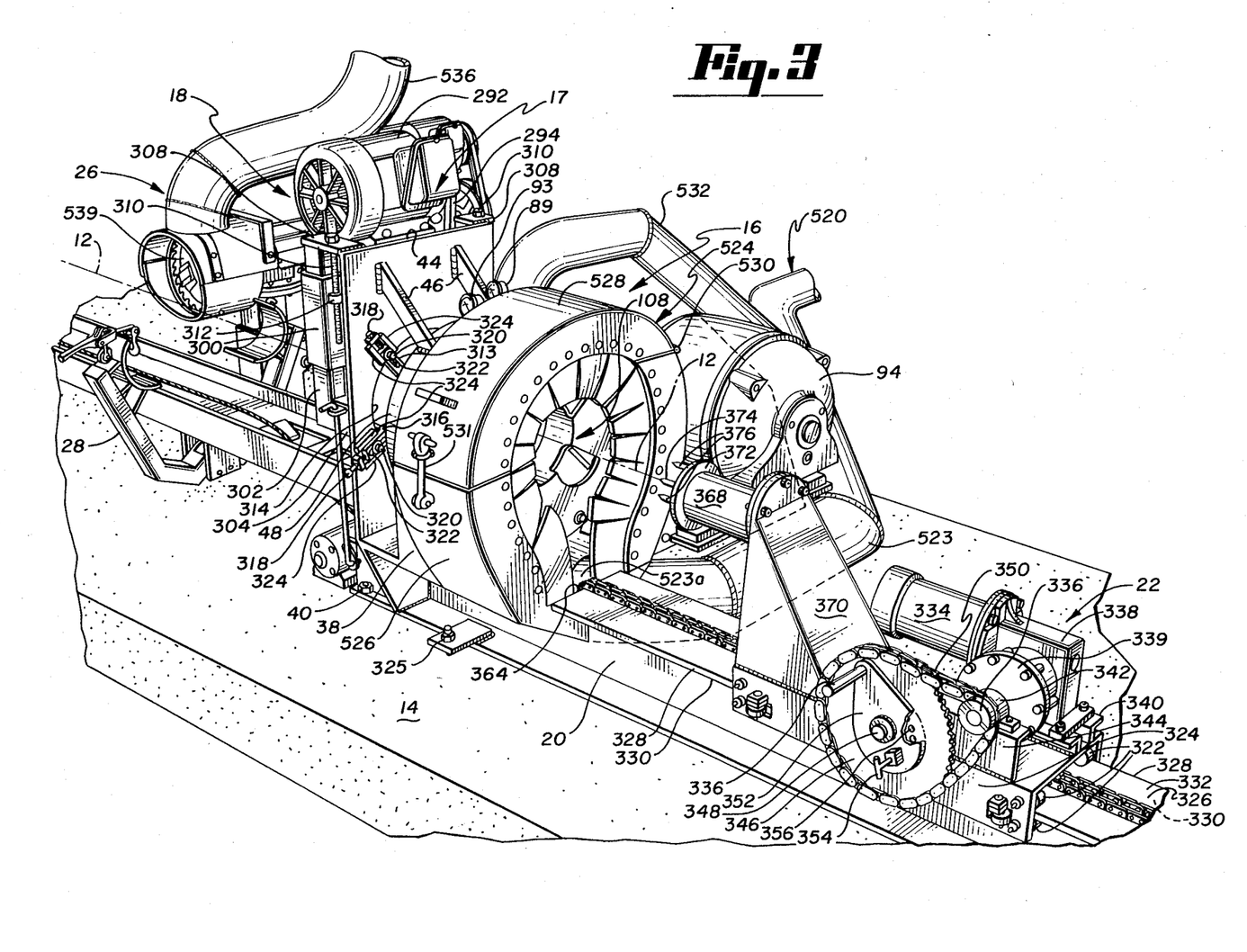
FIG. 3 is a partial perspective view taken at arrow A in FIG. 1.
Figure 4:
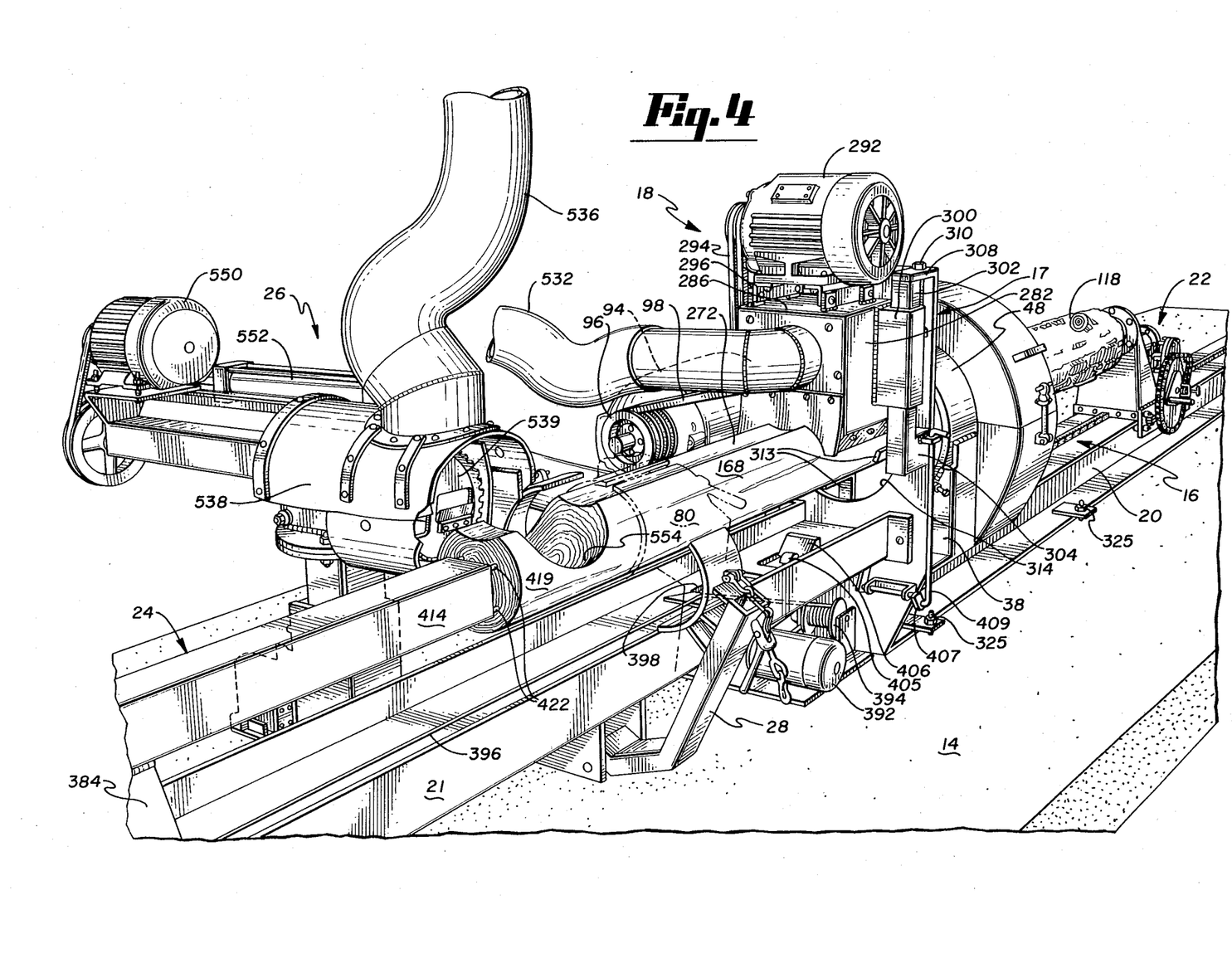
FIG. 4 is a partial perspective view taken at arrow B in FIG. 1.

Referring to FIGS. 2, 3 and 4, the carrier 91 is driven by a variable speed motor 94 (FIGS. 3 and 4) bolted to base 14 adjacent annular cutter 16. Motor 94 has a multiple V-groove output pulley 96 driving a multiple V-belt 98 around a multiple V-groove drive pulley 100 pressed onto the rear of drum 56 at 102, as shown particularly in FIG. 2.

Figures 5, 6, 7, 8, 9, 10, 11:
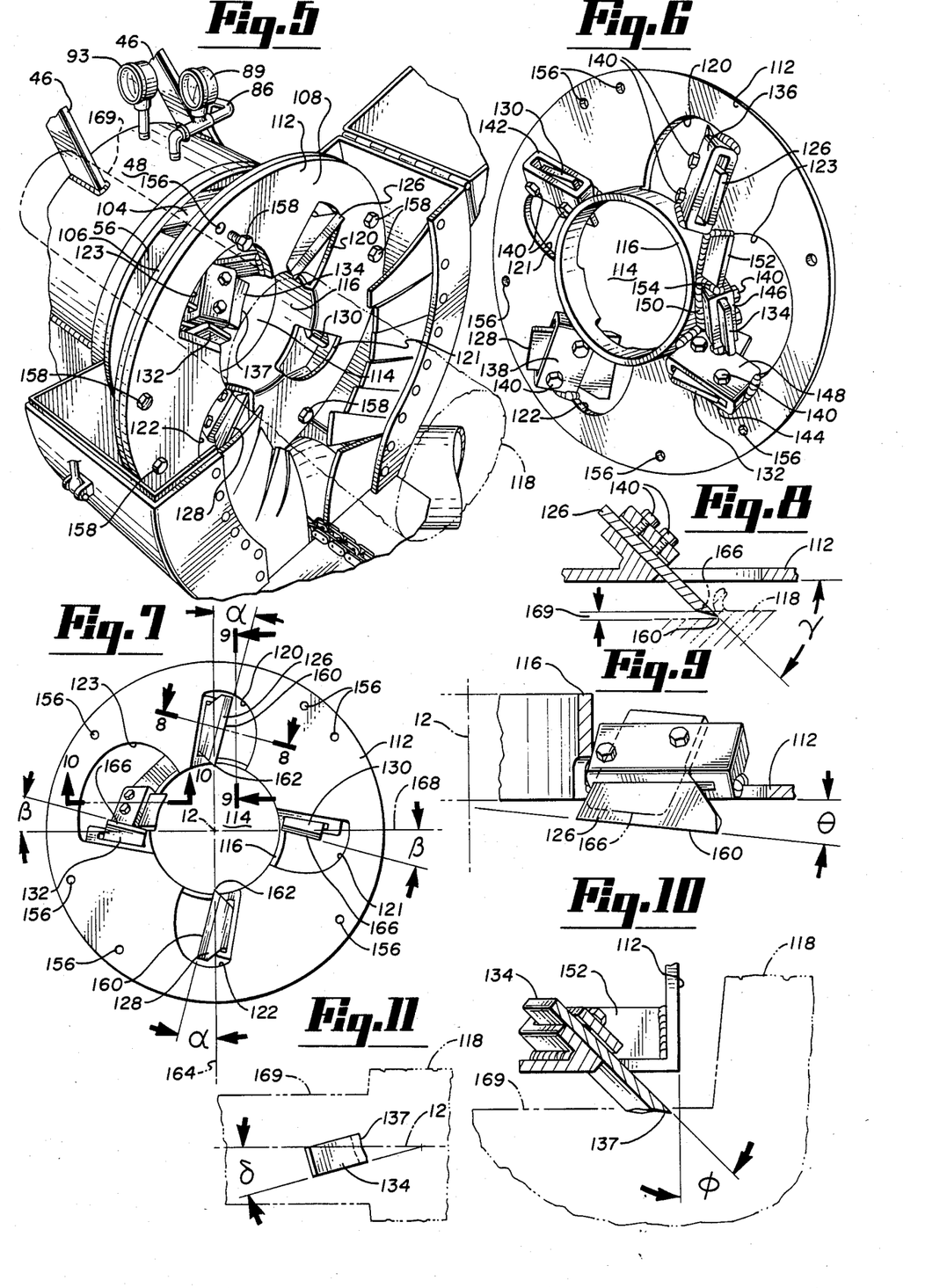
FIG. 5 is a partial perspective view taken at arrow C in FIG. 1.
FIG. 6 is a rear quarter perspective view of the annular cutter head.
FIG. 7 is a front elevational view of the annular cutting head.
FIG. 8 is an oblique sectional view taken along line 8—8 of FIG. 7 and slightly enlarged.
FIG. 9 is an elevational view in section taken along line 9—9 of FIG. 7, slightly enlarged, and with part of the log workpiece shown in phantom.
FIG. 10 is a bottom plan sectional view taken along line 10—10 of FIG. 7 and slightly enlarged.
FIG. 11 is a plan view of the planar blade of FIG. 10 showing the position of the planar blade over the longitudinal axis and the log workpiece which is shown in phantom.

Referring to FIGS. 2 and 5, mounted forward on carrier drum 56 are short stout angle braces 104 and a circular mounting rim 106 which is shaped like a large washer to which is bolted an annular cutter head 108. The cutter head 108 has, as integral parts, a ring-shaped member 110 and flange-like member 112.

Referring to FIGS. 5, 6 and 7, the cutter head 108 with the flange-like member 112 is substantially disc-shaped, having a central circular opening 114 defined by ring-shaped member 116, through which passes the log blank workpiece 118. There are four openings 120, 121, 122 and 123, respectively, in annular cutter 108.

Two diametrically opposed shaper blades 126 and 128 project forwardly through openings 120 and 122, respectively. A planing blade 134 also is held within the opening 123. As best seen in FIG. 6, the shaper blades 126 and 128 are held within fixtures 136 and 138, respectively, and clamped therein securely with bolts 140. Blank blades 130 and 132 likewise are held within fixtures 142 and 144, respectively, and clamped securely therein with bolts 140. Planing blade 134 is held within a fixture 146 and therein clamped securely with bolts 140. Fixtures 136, 138, 142 and 144 are each welded to the back of shown projecting inwardly toward longitudinal axis 12, and sharp edge 160 is at an angle θ of approximately 5 degrees from the face of flange-like member 112 which is also typical of shaper blade 128.

Referring to FIGS. 10 and 11, planar blade 134 (FIG. 10) is set at an angle φ of approximately 45 degrees from the face of flange-like member 112. Planar blade 134 (FIG. 11) is also set at an angle δ of approximately 15 degrees CCW from longitudinal axis 12. Sharp edge 137 of planar blade 134 is concave with a radius respecting the φ angle equal to the desired finished peripheral surface 169 of the log 188; the angle δ providing the concave sharp edge 137 a slicing purchase against the wood material to effect a fine finished surface 169 on log 118, as also seen in FIG. 5.

COVE CUTTER

Figures 12, 13, 14:
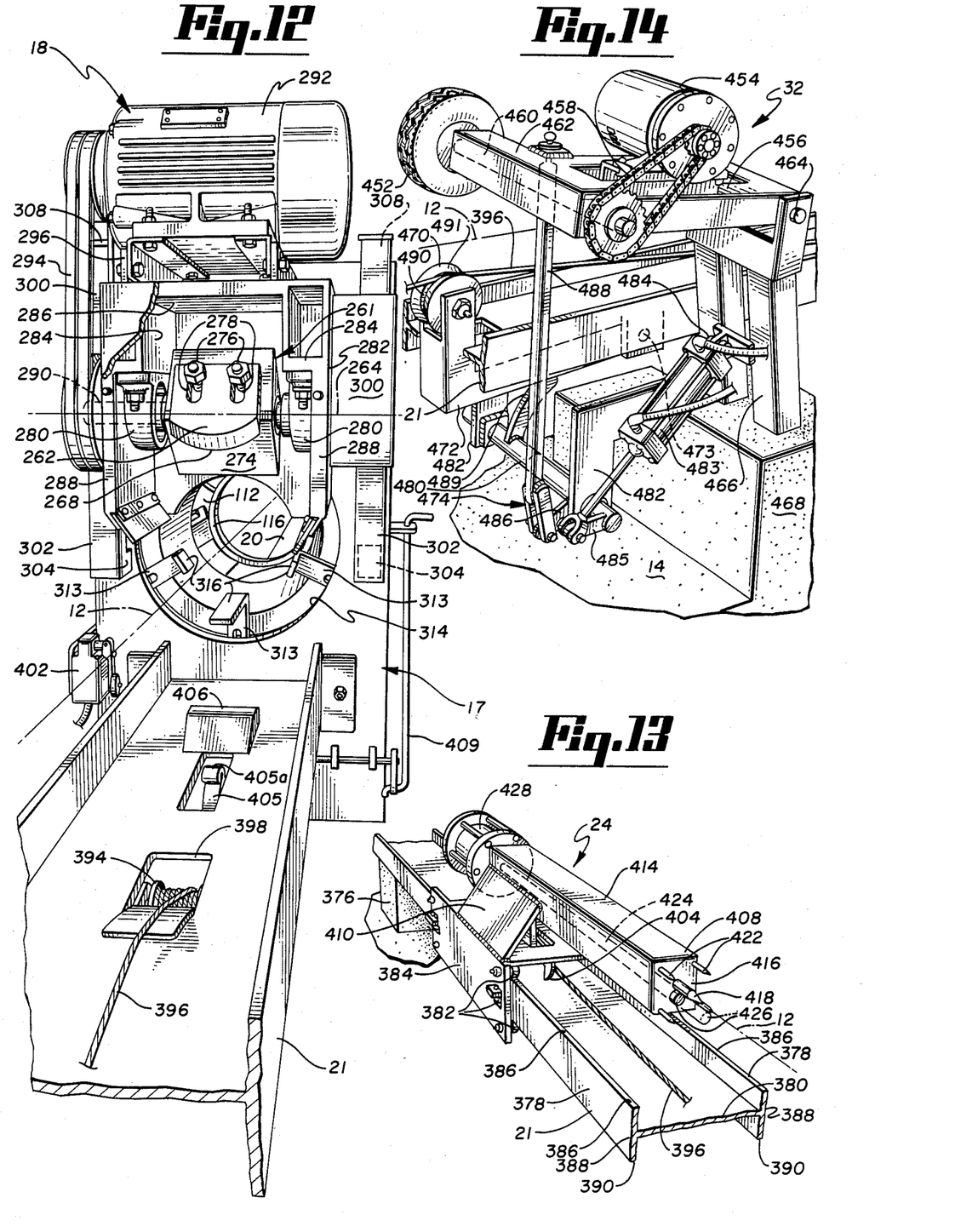
FIG. 12 is a partial rear perspective view taken at arrow D in FIG. 1.
FIG. 13 is a partial front quarter perspective view taken at arrow E in FIG. 1.
FIG. 14 is a partial front quarter perspective view taken at arrow F in FIG. 1.

Referring to FIGS. 2 and 12, the cove cutter is shown generally at 18, the cover cutter head 261 having blades 262 (FIGS. 2 and 12). Cutter head 261 is rotationally mounted on an axis 264 (FIG. 12), aligned transverse to longitudinal axis 12 and above log workpiece 118 with the cove blades 262 tipped with convex cutting edges 268 travelling a path defined by arrow 270 (FIG. 2) and producing a circular cove 272 along the spine of a passing log 118.

Referring to FIG. 12, cove blades 262 are secured to a cube-shaped arbor 274 by bolts 276 through slots 278, the slots 278 providing adjustment for coordinating the cove blades 262. Arbor 274 is journalled by pillow blocks 280 bolted within a shroud enclosure 282 on two longitudinal rectangular members 284, a top plate 286 and side plates 288. The arbor shaft 290 is driven by a motor 292 and V-belt drive 294 in a conventional manner. The motor 292 is mounted at 296 to the top plate 286. Welded to the side plates 288 are vertical rectangular guides 300, which are slidable on vertical rectangular tracks 302 which are welded below to standoffs 304 and above to bridges 308. The standoffs 304 and bridges 308 are welded to rigid frame 17.

Referring once again to FIG. 3, cove depth of cut adjustment is made by means of long bolts 310 through plane holes in upper bridge 308. Bolts 310 are each threaded through an eye 312, which is welded to the front side of each guide 300, respectively.

Referring to FIGS. 3 and 12, log guides 313 are mounted to frame 17 (FIG. 12) in a radial pattern around a circular hole 314 through which passes log workpiece 118 which is slidably guided along longitudinal axis 12 by skids 316 projecting rearwardly from the inside ends of the log guides 313. Log guides 313 are adjustable by means of adjustment bolts 318 (FIG. 3) and retained by clamping bolts 320 through slotted holes 322 and within the side rails 324 welded to forward face of frame 17 in a radial pattern around hole 314.

Figure 15A:
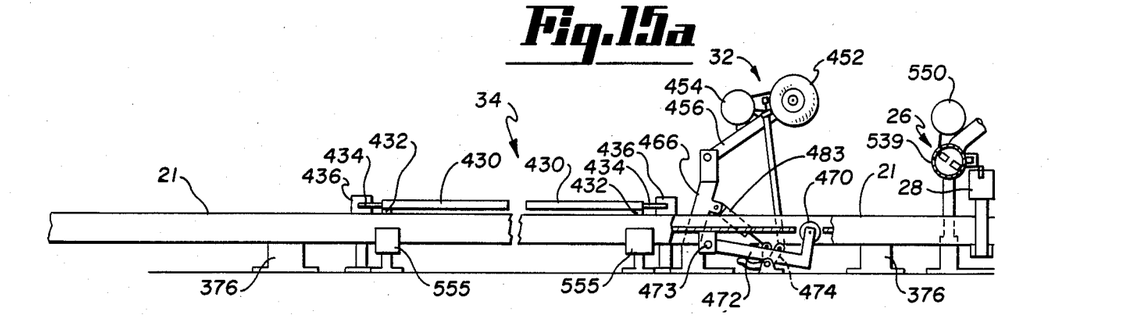
FIGS. 15a and 15b are right side elevational views in simplified form and reduced in scale.
Figure 15B:
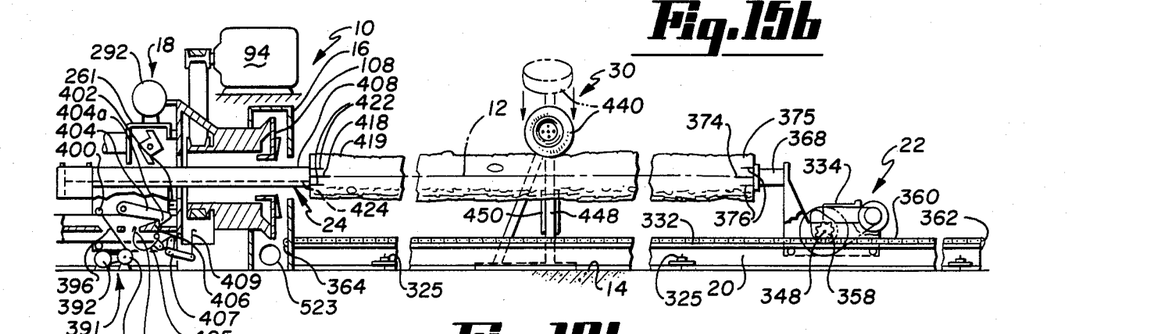

Referring to FIGS. 3 and 15b, forward track 20 projects forwardly along and beneath longitudinal axis 12 (FIG. 3) and is secured to base 14 with anchor bolts 325. The transport carriage indicated generally at 22 is slidably mounted to track 20 with rollers 322 which are each rotatably fastened within an inverted U-channel base 324 and grouped at the corners, to roll on the top 326, sides 328 and underside 330 of upper flange 332 of track 20. Transport carriage 22 is driven along the top 326 of upper flange 332 by a motor 334 with a sprocket 336 through right angle worm drive 338 which is mounted to base 324 at 340 and is also supported by a pillow block 342 which journals the sprocket 336 upon a support member 344. On the output of the worm drive 338 to the sprocket 336 is a slip clutch 339 which limits torsion between worm drive 338 and sprocket 336. A large sprocket 346 is rotatably journalled on drive shaft 348 and driven by endless chain 350 from sprocket 336. A flat tear drop shaped crank 352 is fixedly mounted to the end of the drive shaft 348 to rotate along with the driveshaft 348 flat against the outside face of large sprocket 346. Power is transmitted from large sprocket 346 to drive shaft 348 through the crank 352 by means of T-handled detent pin 354, said pin 354 having a standard quarter turn lock out which is mounted through crank 352 to engage one of a number of holes 356 arranged on a circle around drive shaft 348 through large sprocket 346. Power is transmitted through drive shaft 348, which is journalled to base 324, to a pinion 358 in the form of a sprocket (FIG. 15b) which meshes with a rack 360 in the form of a length of endless chain which is stretched along the top 326 of the top track flange 332 beneath longitudinal axis 12 and is attached to the front end 362 and rear end 364 of track 20. Carriage 22 may be driven manually (FIG. 3) by means of disengaging T-handled detent pin 354 from a hold 356 and turning it 90 degrees to lock it open and turning the crank manually with handle 366. A workpiece clamp fixture 368 projects rearwardly on longitudinal axis 12 from a rigid stand 370 welded to base 324. Fixture 368 has the shape of a spool with a cylindrical body and circular end flange 372. Projecting rearwardly from end flange 372 are a long center spike 374 aligned with longitudinal axis 12 which penetrate the center point of the workpiece end 375 (FIG. 15b) and an array of shorter spikes 376 which penetrate end 375 of workpiece 118 to keep log workpiece 118 from spinning on longitudinal axis 12.

Referring to FIGS. 2, 12, 15a and 15b, after track 21 projects rearwardly along and beneath longitudinal axis 12 from frame 17 and is supported above base 14 by piers 376 (FIGS. 15a and 15b). Track 21 is H-shaped in cross-section having uprights 378 and a cross web 380 (FIG. 13). The receiver carriage, indicated generally at 24, is slidably mounted on track 21 with rollers 382 which are each rotatably fastened within a second inverted U-channel base 394 and grouped to the corners, to roll on the top 386, outsides 388 and bottom 390 of uprights 378 of track 21. Receiver carriage 24 is drawn forward on track 21 (FIG. 2) by means of a winch 391, including motor 392 which drives a windlass 394 around which is wound a braided steel cable 396, which passes up through a window opening 398 in web 380 of track 21 and back to an attachment point 400 (FIG. 15b) under base 394. Carriage 24 is drawn forward by motor 392 until current to motor 392 is cut by a limit switch 402 (as best seen in FIG. 12), located behind frame 17 and alongside track 21 to actuate, cutting current to motor 392, when carriage base 384 reaches the extreme forward location. Base 384 has a latch hook 404 (FIG. 15b) which is ramped up and drops over a striker 406 as carriage 24 is drawn to the forward position and which locks carriage 24 against rearward movement. Hook 404 (FIG. 2) is disengaged from striker 406 by means of a lift finger 405 which is actuated manually through a linkage 407. Linkage 407 comprises a pull 409 which turns bell crank 409a on shaft 411 which, in turn, rotates link 413 to lift hook 404 and hold it up to clear striker 406 during initial rearward movement of carriage base 384 until lift fingertip 405a is pushed rearward and down by contact with the downwardly depending tip 404a of hook 404.

Figure 18:
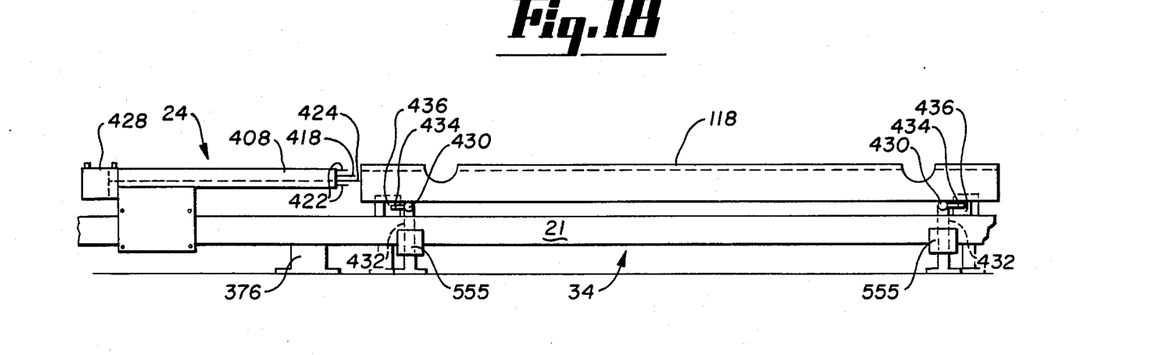
FIG. 18 is a partial right side elevational view of the discharge end of the invention.

Referring to FIGS. 1, 13, 15b and 18, a second workpiece clamp fixture 408 (FIG. 13) is projected forwardly on the longitudinal axis 12 upon a rigid structure 410 welded to base 384. Fixture 408 is a section of square mechanical tubing 414 with its long axis common with longitudinal axis 12 and capped off on its forward end by a wall 416. Projecting forwardly from the wall 416 are a long center spike 418 on longitudinal axis 12 which penetrates the center of the second workpiece end 419 and an array of shorter spikes 422 which penetrate the second log workpiece and 419 (FIG. 15b) of log workpiece 118 to assist spikes 376 on transport carriage fixture 368 in keeping log workpiece 118 from spinning on longitudinal axis 12. Second fixture 408 (FIG. 13) has a plunger 424 with its forward end 426 projecting through wall 416 and actuated by an air cylinder 428 which is fixedly mounted to the rear of second fixture 408. A plunger 424 is actuated by a cylinder 428 to operate forwardly against log workpiece end 419 to disengage end 419 from the spikes 418 and 422 and discharge finished logs 118 onto fingers 430 (FIG. 18). Fingers 430 are mounted to counterrotate horizontally on the vertical axis of standard 432 and are actuated through bell cranks 434 by air cylinders 436 (FIG. 1) which are mounted on pedestals 438 anchored to base 14.

Referring to FIGS. 1 and 15b, the vibration stabilizer is indicated generally at 30 and comprises a wheel 440 which is rotatably mounted on an arm 442 which is pivotally mounted at 444 (FIG. 1) to the top end 446 of the braced support 448 which is firmly mounted to base 14. An air cylinder 450 is mounted between support 448 and arm 442 to raise wheel 440 when cylinder 450 is contracted and lowers wheel 440 when cylinder 450 is extended to clamped log 118 and maintain stabilizing downward force on log 118 as it passes along on longitudinal axis 12 through the log shaping process.

Referring to FIG. 14, the secondary transport mechanism indicated generally at 32 includes a drive wheel 452, centered above the longitudinal axis 12, which is driven by a motor 454 that is fixedly mounted to an arm 456 and powers the drive wheel 452 through a conventional chain drive 458 and a drive shaft 460 which is rotatably journalled within cross member 462 of arm 456 and is fixedly connected to the hub of wheel 452. Arm 456 is pivoted horizontally at 464 to the top of dual stand 466 which is embedded in a block base 468 integral with base 14. A contoured support roller 470 is rotatably mounted on the end of a support arm 472 that is pivoted at 473 below track 21. Drive wheel 452 and support roller 470 cooperate by means of a connecting linkage indicated generally at 474. Linkage 474 includes a shaft 480 rotatably mounted on support member 482, the shaft 480 being rotated by an air cylinder 483 that is pivotally connected at 484 to the double stand 466 and acts on lever arm 485 of shaft 480. A second lever arm 486 and third arm 487 are both welded to shaft 480. As the mechanism is viewed in FIG. 14, air cylinder 476 extends to rotate shaft 480 CCW through lever arm 485 and, thus, second arm 486 acts through connecting link 488 to pull down on drive wheel 452 while third arm 489 thus acts against the bottom of arm 472 to raise the support roller 470. Air cylinder 476 is retracted to rotate shaft 480 CW through lever arm 477 and, thus, second arm 486 acts through connecting link 488 to push up on drive wheel 452 while third arm 489 thus acts against the bottom of arm 472 to allow support roller 470 to lower. Support roller 470 has a groove 490 around the contact surface 491 of roller 470 to permit cable 396 to pass between roller 470 and log workpiece 118, without effect.

Referring to FIGS. 1, 3 and 4, log shaping apparatus 10 has a conventional wood chip and wood dust collector indicated generally at 36 having ductwork 520. One duct 523 (FIG. 3) is connected at 523a to a clamshell shroud 524 around annular cutter 16 and which encloses cutter head 108. Shroud 524 has a lower half 526 and an upper half 528 hinged at 530 and secured with a bungee 531. A second duct 532 is connected to shroud enclosure 282 around cove cutter 18 (FIG. 4) which surrounds cove cutter head 261 and a third duct 536 is connected to a tubular shroud 538 around saddle cutter saw 539. As seen in FIG. 1, the wood chips and wood dust are conducted away from cutters 16, 18 and 26 and draw in a large volume of air drawn through the ductwork 520 to a vacuum chamber 540 by high capacity fan 542.

Referring to FIGS. 15a and 15b, the operation of the machine in shaping log 118 with apparatus 10 begins with winching receiver carriage 24 forward on after track 21 with winch 391 until carriage 24 operates limit switch 402 to stop motor 392 and therefore carriage 24 at its forward extreme position where hook 404 is dropped over striker 406. Fixture 408 of receiver carriage 24 projects through and slightly forward of annular cutter 16. Next, log 118 is centered on longitudinal axis 12 with end 419 held against center spike 418 of receiver carriage 24. Transport carriage 22 moves rearwardly on forward track 20 until center spike 374 of the transport carriage 22 contacts log end 375 as motor 334 drives transport carriage 22 rearwardly urging center spikes 418 and 374 to penetrate wood ends 419 and 375, respectively. Transport carriage 22 continues rearwardly against log 118 and receiver carriage 24 which is restrained from rearward movement by hook 404, which is latched against striker 406 and the resulting longitudinal force of motor 334 against striker 406 drive spikes 418, 374 and then spikes 422 and 376 to penetrate and firmly clamp log 118 between transport clamp fixture 368 and receiver clamp fixture 408. Vibration stabilizer 30 is employed by lowering wheel 440 to press downwardly upon the spine of log 118 and log 118 is ready to be shaped. Motor 334 is temporarily turned off.

Figure 16A:
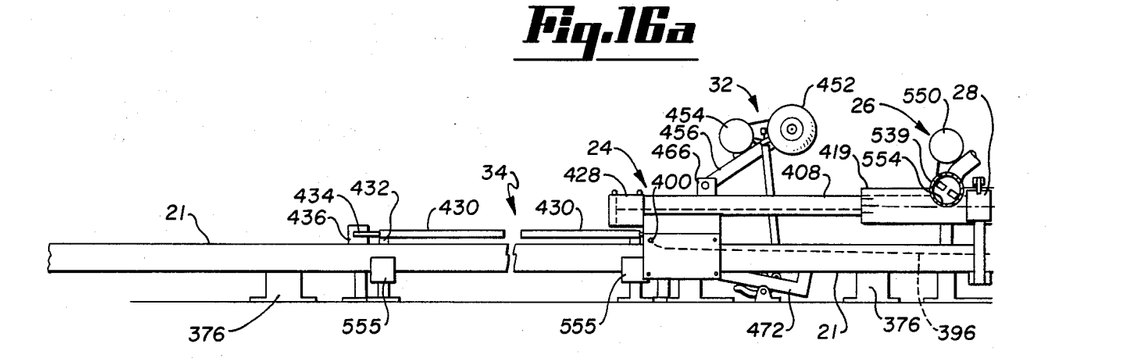
FIGS. 16a and 16b are the views of FIGS. 15a and 15b with parts moved.
Figure 16B:
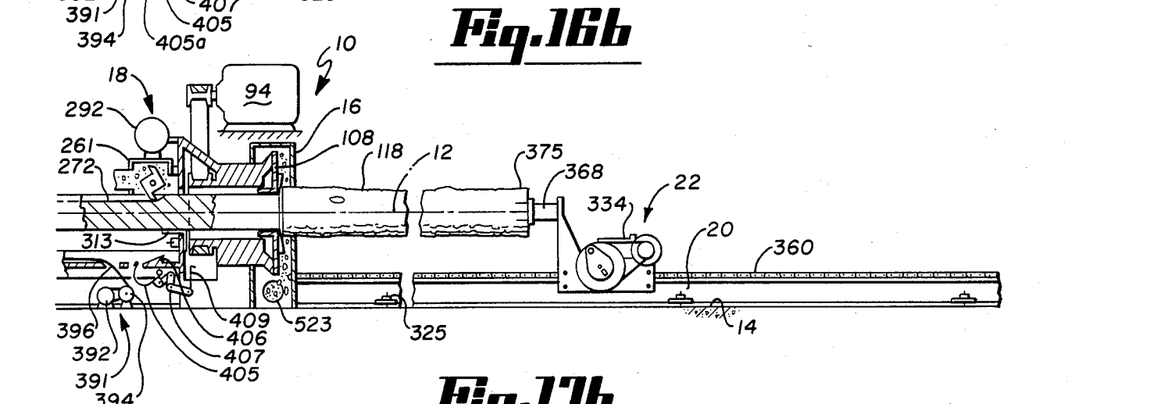

Referring to FIGS. 4, 16a and 16b, motors 94 and 292 which power annular cutter 16 and cove cutter 18, respectively, are turned on. Fan 542, which activates the wood chip and wood dust collector 520, is turned on. Cove cutter 18 is set for depth of cove cut 272 and pawl 409 is raised through which linkage 407 raises lift finger 405 against hook 404 to unlatch receiver carriage 24. Motor 334 is turned on and set for speed driving log workpiece 118 along longitudinal axis 12 through annular cutter 16, which cuts and finishes the cylindrical peripheral of log 118 and cove cutter 18 which cuts circular cove 272 in log 118. Motor 334 is turned off to stop the longitudinal movement of log 118 and saddle cutter clamp 28 firmly grips log 118. Saddle cutter 26 is set for angle and depth of cut. Motor 550 which powers saddle cutter 26 (FIG. 4) is turned on, and actuator 552 projects saw 539 to make saddle cut 554a. Clamp 28 is opened and motor 334 is turned on again. The shaping and coving process is continued as before, interrupted again only to make any additional saddle cuts which follow the previously described procedure until transport carriage 22 reaches close proximity with annular cutter 16. Wheel 440 is raised.

Figure 17A:
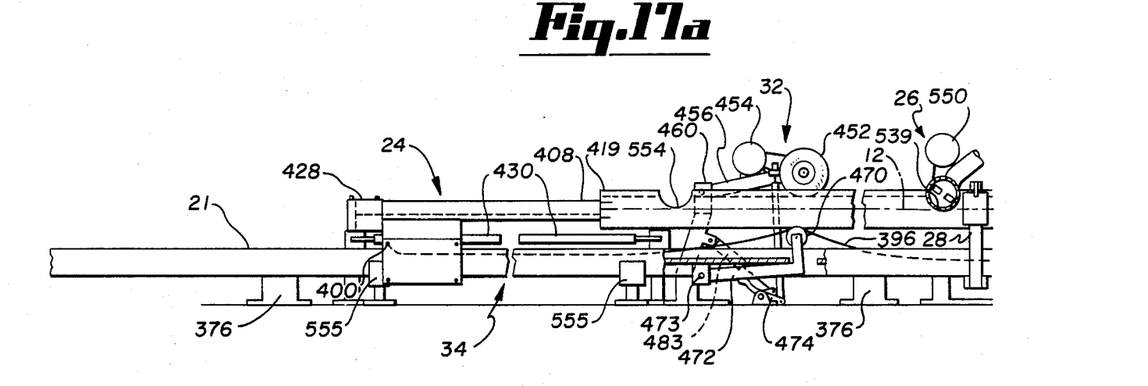
FIGS. 17a and 17b are the views of FIGS. 16a and 16b with parts moved further.
Figure 17B:
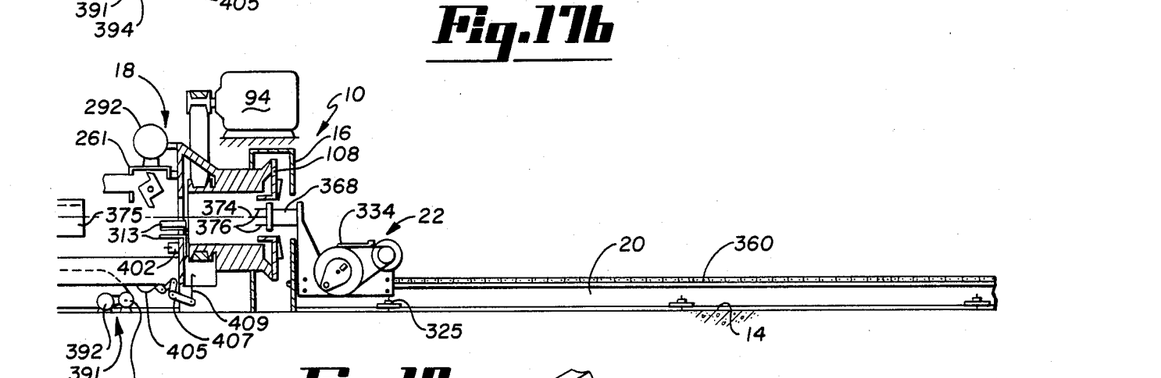

Referring to FIGS. 17a and 17b, secondary transport mechanism 32 is activated through cylinder 476 to linkage 474 to close support roller 470 and wheel 452 on log workpiece 118. Motor 454 is turned on and takes over rearward transportation of log 118 from transport carriage 22 which has stopped rearward motion. Log end 375 is withdrawn from the transport clamping fixture 368 and spikes 374 and 376. Log 118 continues rearward movement along longitudinal axis 12 guided by log guides 313 and receiver carriage 24 and is driven by secondary transport mechanism 32 completely through cutters 16 and 18. The final saddle cut procedure is effected. Motor 334 is reversed moving transport 32 forwardly on track 20 to a point where a next log workpiece will be accepted.

Referring to FIG. 18, the final saddle cut having been completed, log 118 is initially moved rearwardly first by secondary transport mechanism 32 which is opened as log end 375 passes by, and second by the log's own momentum until winch motor 392 is braked, stopping the log over discharge station 32. Cylinders 436 are activated to swing fingers 430 transversely beneath the log and cylinder 428 is activated through plunger 424 to push log end 419 off of the clamping fixture 408 and withdraws it from spikes 418 and 422, allowing finished log 118 to rest upon fingers 430. Finished log 118 is then removed manually or by automatic means and may rest temporarily on beams 555 laying on base 14 at discharge station 34.

Figure 19:
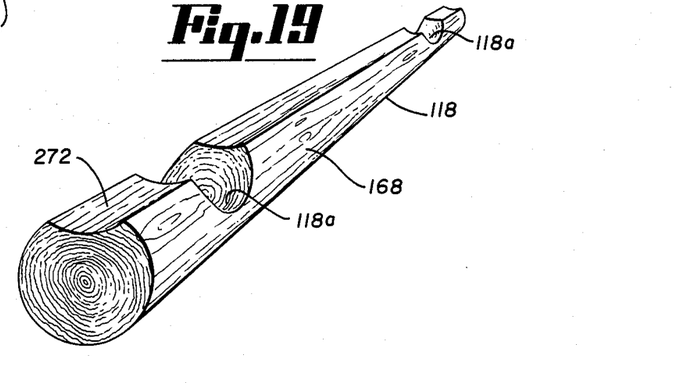
FIG. 19 is a perspective view of a typical finished log product.

Referring finally to FIG. 19, a typically shaped log 118 is shown inverted as it was shaped and having a smooth, finished peripheral surface 168, transverse saddles 554 and a longitudinal cove 272.

Although the present invention has been described with reference to preferred embodiments, workers skilled in the art will recognize that changes may be made in form and detail without departing from the spirit and scope of the invention and the appended claims:

What is claimed is:

1. Log shaping apparatus for shaping a wooden log workpiece into a finished log having a uniform diameter and a smooth surface finish, comprising:

a base;

support means attached to the base for supporting the log workpiece at opposite ends thereof;

annular cutter head means rotatably mounted with its axis of rotation substantially aligned with the longitudinal axis of the log workpiece, said annular cutter head means having an inner annular opening therein having a diameter larger than the diameter of said wooden log workpiece;

a plurality of shaper blades fixedly attached radially about the annular opening of said annular cutter head means, the innermost point of the shaper blades determining the diameter of the finished log;

planar blade means fixedly attached about the inner annular opening of said annular cutter head and set at an angle to the workpiece for finishing the peripheral surface of the log;

means for driving said cutter head about its axis; and means for longitudinally moving said log relative to the cutter head means.

2. The invention of claim 1 wherein the annular cutter means is mounted in a cutter housing which surrounds said annular cutter means and includes waste removal means for removing wood chips and sawdust from the annular cutter head means as it operates on the log workpiece.

3. The invention of claim 2 wherein the waste removal means comprises a waste removal duct operatively connected to the annular cutter head means, vacuum source means connected for pulling wood chips and sawdust through the waste removal duct, and waste receptacle means for storing material drawn from the annular cutter means through the waste removal duct.

4. Log shaping apparatus as defined by claim 1 wherein the plurality of shaper blades comprises:

at least one pair of diametrically opposed shaper blades attached to and projecting through the inner annular opening of said cutter head means with each of the shaper blades angled inwardly toward the longitudinal axis with its edge angled slightly off the transverse axis thereby engaging the log workpiece to remove material therefrom.

5. The invention of claim 4 wherein the angle between the shaper blades and the surface of the log workpiece is approximately 45 degrees.

6. The invention of claim 4 wherein the angle between the log workpiece and the longitudinal axis is approximately 5 degrees.

7. The invention of claim 1 wherein the angle between the planar blade and the annular cutter is selected to permit the planar blade to engage the surface of the workpiece at approximately a 45-degree angle and the edge surface of the planar blade is ground to a concave radius corresponding to the desired radius of the finished log and the angle between the edge of the planar blade and the longitudinal axis is approximately 15 degrees.

8. The invention of claim 1 wherein the shaper blades and the planar blades are all mounted on a flange-like member rotatably mounted within the annular cutter head means.

9. The invention of claim 8 wherein the blades are each removably mounted in blade holding fixtures secured to the flange-like member.

10. The invention of claim 8 wherein the cutter head means includes at least one blank blade mounted on the flange-like member to maintain the depth of cut of the cutter blades into the surface of the workpiece, the blank blade characterized by a blunt edge which contacts the log workpiece slightly behind the circular plane defined by the shaper blade.

11. Log shaping apparatus as defined by claim 1 wherein the support means comprises:

transport carriage means mounted on a forward track for supporting one end of a log workpiece;

receiver carriage means mounted on an after track for supporting the other end of the log workpiece, the receiver carriage means and the transport carriage means being aligned with the longitudinal axis of the log workpiece and each being movable and therealong and disposed on opposite sides of the cutter head means.

12. The invention of claim 11 wherein the transport carriage means includes drive motor means mounted on said carriage means for engaging the forward track and for driving the transport carriage and the log workpiece into the annular cutter head means.

13. The invention of claim 12 wherein the drive motor means includes sprocket means driven by the drive motor means and the forward track includes fixed means engageable by the sprocket means for driving the transport means in response to rotation of the sprocket means by the drive motor means.

14. The invention of claim 11 wherein additional drive means are provided between the annular cutter head means and the receiver carriage for driving the log workpiece and the receiver carriage along the after track after the transport carriage has reached the annular cutter head means at the end of the forward track.

15. The invention of claim 14 wherein the additional drive means comprises a frictional drive wheel means which is brought into contact with the surface of the log workpiece to drive the log along the after track after the end of the log is removed from the transport carriage after the transport carriage reaches the end of its travel on the forward track.

16. The invention of claim 15 wherein the additional drive means also includes idler means for engaging the log workpiece on the side thereof opposite the side of the workpiece engaged by the frictional drive wheel thereby permitting the frictional drive wheel to be forced against the log workpiece with more force.

17. The invention of claim 16 wherein the drive wheel means and the idler means are pivotally mounted for movement toward and away from the log workpiece and wherein linear actuator means are provided for moving the drive wheel means and the idler means and forcing the drive wheel means the idler means into positive engagement with the surface of the workpiece.

18. The invention of claim 1 wherein cove cutting means mounted on said base along the longitudinal axis of the log workpiece are provided for providing a longitudinal cove cut along the axis of the workpiece simultaneous with the shaping and planing of the annular cutter means in a single pass of the log workpiece through the machine.

19. The invention of claim 1 which also includes saddle cutter means mounted on the base adjacent the longitudinal axis of the log workpiece for cutting saddle cuts transversely across the workpiece at selected locations.

20. The invention of claim 1 which also includes vibration stabilizing means mounted on the base to absorb and dampen vibration of the log workpiece during the cutting action of the annular cutter head means.

21. The invention of claim 20 wherein the vibration stabilizing means comprises a pivotally mounted wheel for engaging a portion of the surface of the log workpiece prior to the annular cutter head assembly to absorb and dampen vibration of the log workpiece.

* * * * *